United States Patent

[11] 3,596,072

[72] Inventor Shoji Iwamoto
Kokubunji-shi, Japan
[21] Appl. No 827,260
[22] Filed May 23, 1969
[45] Patented July 27, 1971
[73] Assignee Hitachi, Ltd.
Tokyo, Japan
[32] Priority May 24, 1968
[33] Japan
[31] 43/34742

[54] ERROR-DETECTING CIRCUITRY IN ADDER SYSTEM
14 Claims, 12 Drawing Figs.

[52] U.S. Cl. .......... 235/153
[51] Int. Cl. .......... G06f 11/10
[50] Field of Search .......... 235/153

[56] References Cited
UNITED STATES PATENTS

| | | | |
|---|---|---|---|
| 3,185,822 | 5/1965 | Davis | 235/153 |
| 3,287,546 | 12/1966 | Geller | 235/153 |

*Primary Examiner*—Malcolm A. Morrison
*Assistant Examiner*—R. Stephen Dildine, Jr.
*Attorney*—Craig, Antonelli, Stewart & Hill

ABSTRACT: Three signals representing augend and addend are supplied to a carry save adder and a predicted carry circuit which generates a predicted carry signal for each order when corresponding bits of said three signals are coincident. An error check signal is generated by an error check circuit which checks parity of sum and carry signals produced by said carry save adder and said predicted carry signal. By employing the predicted carry circuit, the number of circuit components for the error detection is greatly reduced, and hence the cost of the error detection is reduced correspondingly.

FIG. 1
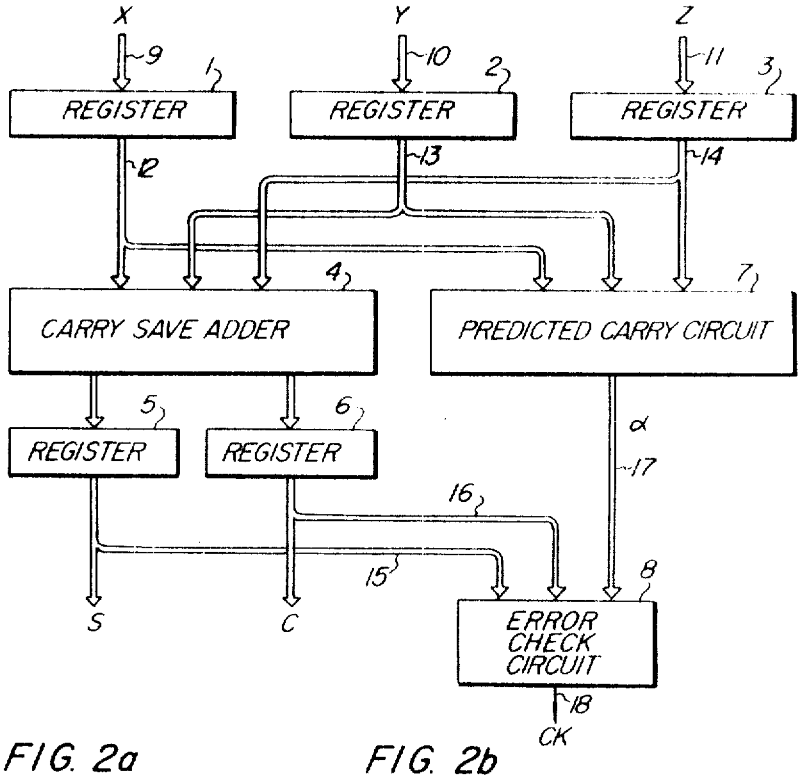
FIG. 2a FIG. 2b
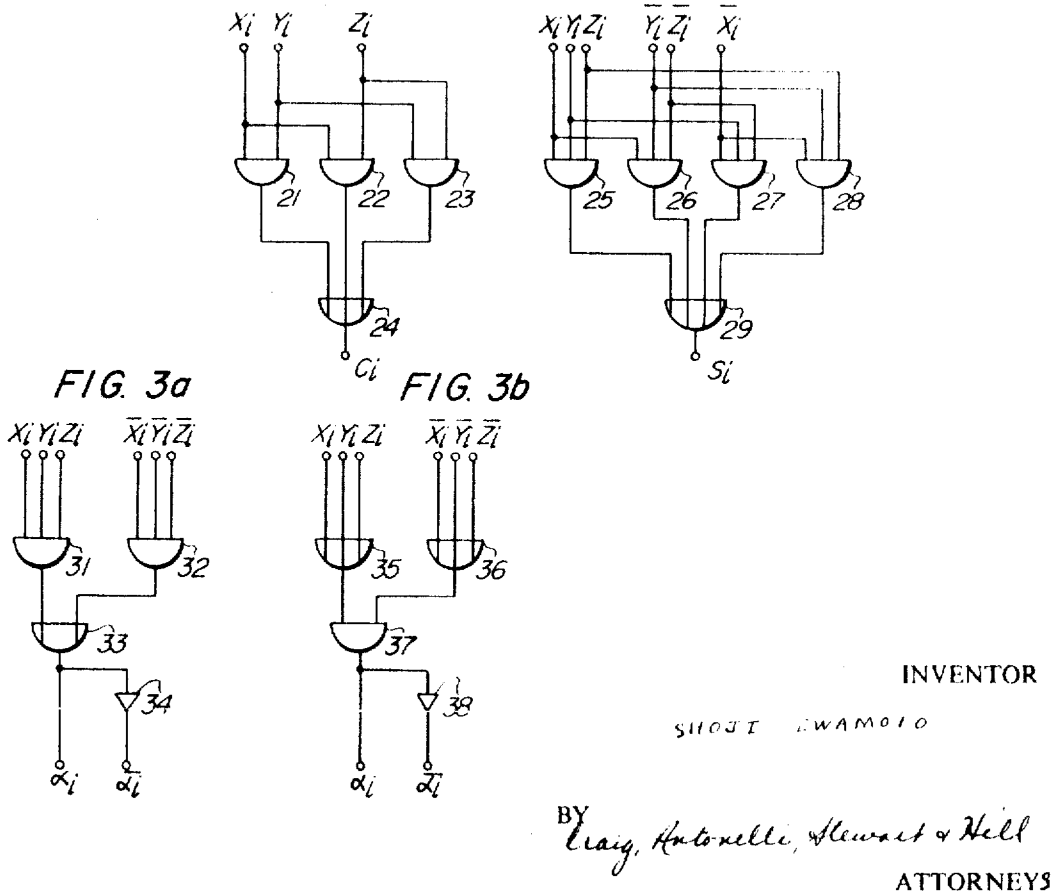
FIG. 3a FIG. 3b
INVENTOR
SHOJI IWAMOTO
BY Craig, Antonelli, Stewart & Hill
ATTORNEYS

INVENTOR

SHOJI IWAMOTO

BY
Craig, Antonelli, Stewart & Hill
ATTORNEYS

INVENTOR

SHOJI IWAMOTO

BY
Craig, Antonelli, Stewart & Hill
ATTORNEYS

ERROR-DETECTING CIRCUITRY IN ADDER SYSTEM

BACKGROUND OF THE INVENTION

1. Field of the Invention

This invention relates to an adder system including an error-detecting circuitry in an information-processing apparatus and more particularly to an error-detecting circuitry for a carry save adder in which each carry is separately stored instead of being propagated.

2. Description of the Prior Art

As a method of checking the operation error of an adder a method of parity check is well known.

Since a carry save adder produces sum and carry separately as operation results, it is necessary to perform an error check both for the sum and carry. As regards the sum, since the parity thereof is conserved before and after the operation, an error check is possible in terms of the parity check. As regards the carry, however, since the parity is not conserved, an error check in terms of the parity check cannot be effected by itself.

Therefore, a method may be employed, for example, in which inconformity between the results of operations of two sets of carry save adders provided for this purpose is detected as an error. However, this method is very expensive because many circuit components are involved.

SUMMARY OF THE INVENTION

It is a primary object of the invention to provide an inexpensive error-detecting circuitry in an adder system.

It is another object of the invention to provide an error-detecting circuitry capable of error checking both sum and carry in a carry save adder.

It is a further object of the present invention to provide an error-detecting system capable of error checking in a carry save adder in terms of the parity check by being provided with a predicted carry circuit.

BRIEF DESCRIPTION OF THE DRAWING

FIG. 1 is a block diagram of an embodiment of the invention;

FIGS. 2*a* and 2*b* are circuit diagrams constituting together the carry save adder for one order in the embodiment of FIG. 1;

FIGS. 3*a* and 3*b* are circuit diagrams of different examples of the predicted carry circuit in the embodiment of FIG. 1;

DESCRIPTION OF THE PREFERRED EMBODIMENTS

Figure 4:
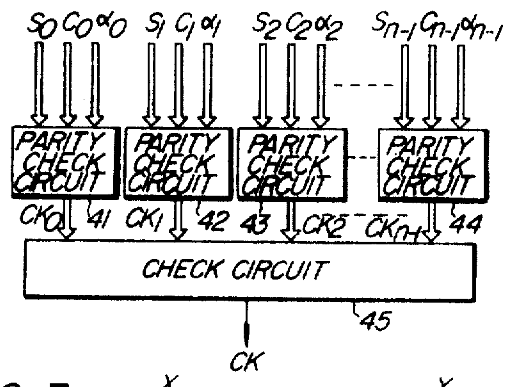
FIG. 4 is a block diagram of an example of the error check circuit in the embodiment of FIG. 1.

Ordinary adders are so constructed that carry is successively propagated from lower orders to higher orders to provide a final sum. In such adders, since the carry must be propagated from the lowest order to the highest order in the worst case, the operation time of addition is very long and hence the operation of multiplication or division which is performed by the repetition of addition is a very time consuming operation.

In high-speed computers or the like, therefore, a so-called carry save adder in which carry is separately held for each order together with the sum of digits of the same order without being propagated to higher orders is employed.

The present invention is intended to detect the operation error of the carry save adder a system for which is shown in FIG. 1 in a block form. Signals X and Y together representative of an augend and a signal Z representative of an addend are set at registers 1, 2 and 3 through signal lines 9, 10 and 11, respectively. The signals X, Y and Z set at the registers 1, 2 and 3 are supplied through signal lines 12, 13 and 14 to a carry save adder 4 which generates a signal S representing the sum and a signal C representing a carry, which signals in turn are set at registers 5 and 6, respectively.

FIGS. 2*a* and 2*b* show together a carry save adder for one order. The carry save adder 4 in FIG. 1 is constituted by multiple sets of circuits as shown in FIGS. 2*a* and 2*b*.

As is well known, the sum $S_i$ and carry $C_i$ of an augend $X_i$ and $Y_i$ and an addend $Z_i$ of the *i*-th order of the carry save adder are represented by $$\left.\begin{aligned} S_i &= X_i\cdot Y_i\cdot Z_i + X_i\cdot \overline{Y_i}\cdot \overline{Z_i} + \overline{X_i}\cdot Y_i\cdot \overline{Z_i} + \overline{X_i}\cdot \overline{Y_i}\cdot Z_i \\ C_i &= X_i\cdot Y_i + X_i\cdot Z_i + Y_i\cdot Z_i \end{aligned}\right\} \quad (1)$$

where the sign "·" represents a logical product, the sign "+" represents a logical sum, and $\overline{X_i}$, $\overline{Y_i}$, $\overline{Z_i}$ represent inverted signals of $X_i$, $Y_i$, $Z_i$, respectively. The logical circuits of FIGS. 2*a* and 2*b* represent the carry and sum, respectively, of formula (1).

AND circuits 21, 22 and 23 in FIG. 2*a* generate logical products of the input signals $X_i$ and $Y_i$, $X_i$ and $Z_i$, and $Y_i$ and $Z_i$, respectively. Outputs from the AND circuits 21, 22 and 23 are supplied to an OR circuit 24 and the logical sum of these outputs is formed therein to deliver it as a carry signal $C_i$.

AND circuits 25 to 28 in FIG. 2*b* form logical products of the input signals ($X_i$, $Y_i$, $Z_i$), ($X_i$, $\overline{Y_i}$, $\overline{Z_i}$), ($\overline{X_i}$, $Y_i$, $\overline{Z_i}$)and ($\overline{X_i}$, $\overline{Y_i}$, $Z_i$), respectively, and supply their outputs to an OR circuit 29 where the logical sum of these outputs is formed. The logical sum is derived from the OR circuit 29 as a sum signal $S_i$.

A predicted carry circuit 7 in FIG. 1 is supplied with the signals *X*, *Y* and *Z* through the signal lines 12, 13 and 14 to generate a predicted carry signal $\alpha$.

The predicted carry signal $\alpha$ is generated in such a manner that the parity of the sum signal *S* and the carry signal *C* generated by the carry save adder 4 and the predicted carry signal $\alpha$ is always maintained constant. The parity for the *i*-th order is shown in Tables I and II. In Tables I and II, the sign " " represents an exclusive logical sum.

TABLE I

| $X_i$ | $Y_i$ | $Z_i$ | $S_i$ | $C_i$ | $\alpha_i$ | $S_i \oplus C_i \oplus \alpha_i$ |
|---|---|---|---|---|---|---|
| 0 | 0 | 0 | 0 | 0 | 1 | 1 |
| 0 | 0 | 1 | 1 | 0 | 0 | 1 |
| 0 | 1 | 0 | 1 | 0 | 0 | 1 |
| 0 | 1 | 1 | 0 | 1 | 0 | 1 |
| 1 | 0 | 0 | 1 | 0 | 0 | 1 |
| 1 | 0 | 1 | 0 | 1 | 0 | 1 |
| 1 | 1 | 0 | 0 | 1 | 0 | 1 |
| 1 | 1 | 1 | 1 | 1 | 1 | 1 |

TABLE II

| $X_i$ | $Y_i$ | $Z_i$ | $S_i$ | $C_i$ | $\alpha_i$ | $S_i \oplus C_i \oplus \alpha_i$ |
|---|---|---|---|---|---|---|
| 0 | 0 | 0 | 0 | 0 | 0 | 0 |
| 0 | 0 | 1 | 1 | 0 | 1 | 0 |
| 0 | 1 | 0 | 1 | 0 | 1 | 0 |
| 0 | 1 | 1 | 0 | 1 | 1 | 0 |
| 1 | 0 | 0 | 1 | 0 | 1 | 0 |
| 1 | 0 | 1 | 0 | 1 | 1 | 0 |
| 1 | 1 | 0 | 0 | 1 | 1 | 0 |
| 1 | 1 | 1 | 1 | 1 | 0 | 0 |

Table I is for the case where the predicted carry signal $\alpha_i$ is generated so that odd parity is always maintained between the signals $S_i$, $C_i$ and $\alpha_i$, and Table II is for the case where the signal $\alpha_i$ is generated so that even parity is always maintained for the signals $S_i$, $C_i$ and $\alpha_i$.

The signal $\alpha_i$ in Table I is "1" only when all of the signals $X_i$, $Y_i$ and $Z_i$ are simultaneously "0" or "1," and the logical equation thereof is $$\alpha_i = X_i\cdot Y_i\cdot Z_i + \overline{X_i}\cdot \overline{Y_i}\cdot \overline{Z_i} \qquad (2)$$

Similarly, the signal $\alpha_i$ in Table II is "1" when all of the signals $X_i$, $Y_i$ and $Z_i$ are not simultaneously "O" or "1," that is, when one or two of the signals $X_i$, $Y_i$ and $Z_i$ are "O" while the remainder is "1," and the logical equation thereof is $\alpha_i=\overline{X_i\cdot Y_i\cdot Z_i+\overline{X}_i\cdot\overline{Y}_i\cdot\overline{Z}_i}=(\overline{X}_i+\overline{Y}_i+\overline{Z}_i)\cdot(X_i+Y_i+Z_i)$ (3)

FIGS. 3*a* and 3*b* are logical circuits performing the logical operation of equations (2) and (3). The predicted carry circuit 7 in FIG. 1 is constituted by a plurality of circuits of FIG. 3*a* or 3*b* correspondingly to respective orders.

FIG. 3*a* is an example of the circuit of the *i*th order of the predicted carry circuit 7 as stated above, and is constructed on the basis of Table I, i.e. the logic of equation (2). AND circuits 31 and 32 forming logical products of input signals $X_i$, $Y_i$, $Z_i$ and $\overline{X}_i$, $\overline{Y}_i$, $\overline{Z}_i$, respectively, supply their output signals to an OR circuit 33 which forms the logical sum of the supplied output signals to generate the predicted carry signal $\alpha_i$ of the *i*-th order as its output signal. The output signal from the OR circuit 33 is also supplied to an inverter circuit 34 which generates an inverted signal $\overline{\alpha}_i$ of the signal $\alpha_i$.

FIG. 3*b* is another example of the circuit of the *i*-th order of the predicted carry circuit 7, and is constructed on the basis of Table II, i.e. the logic of equation (3). OR circuits 35 and 36 forming logical sums of input signals $X_i$, $Y_i$, $Z_i$ and $\overline{X}_i$, $\overline{Y}_i$, $\overline{Z}_i$, respectively, supply their output signals to an AND circuit 37 which forms the logical product of the output signals from the OR circuits 35 and 36 to generate the predicted carry signal $\alpha_i$ of the *i*-th order as its output signal. The output signal from the AND circuit 37 is also supplied to an inverter circuit 38 which generates an inverted signal $\overline{\alpha}_i$ of the signal $\alpha_i$.

The predicted carry signal $\alpha$ generated by the predicted carry circuit 7 in the above-described manner is supplied, together with the sum signal S and the carry signal C set in the registers 5 and 6, respectively, to an error check circuit 8 (FIG. 1).

As is evident from the explanation of Tables I and II, the parity of the signals *S*, *C* and $\alpha$ is checked for each order at the error check circuit 8. If there is even one set of the signals not having the predetermined parity, the error check circuit 8 generates an error check signal CK.

Therefore, a construction of the error check circuit 8 is as shown in FIG. 4, for example. The signals $(S_0, C_0, \alpha_0)$, $(S_1, C_1, \alpha_1)$, ..., $(S_{n11}, C_{n11}, \alpha_{n11})$ for respective orders of the sum signal *S*, carry signal *C*, and predicted carry signal $\alpha$ are supplied to parity check circuits 41 to 44, respectively, to effect parity check for each order. Output signals $CK_0$, $CK_1$, ..., $CK_{n11}$ from the parity check circuits 41 to 44 are supplied to a check circuit 45 to generate the error check signal *CK*.

Figure 5:
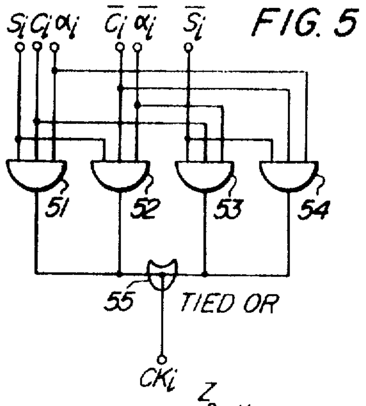
FIG. 5 is a circuit diagram showing the construction of a part of the block diagram of FIG. 4.

The logic of the *i*-th order of the above-described parity check can be represented by $$CK_i=S_i\oplus C_i\oplus\alpha_i=S_i\cdot C_i\cdot\alpha_i+S_i\cdot\overline{C}_i\cdot\overline{\alpha}_i+\overline{S}_i\cdot C_i\cdot\overline{\alpha}_i+\overline{S}_i\cdot\overline{C}_i\cdot\alpha_i \quad (4)$$

and an example of the circuit thereof is shown in FIG. 5.

As is evident from equation (4), the logic of three-input parity check is the same as the logic of the sum $S_i$ of equation (1), and therefore the circuit of FIG. 2*b* can be employed as the parity check circuit of FIG. 4, wherein the signals $S_i$, $C_i$, $\alpha_i$, $\overline{S}_i$, $\overline{C}_i$, $\overline{\alpha}_i$ are supplied thereto instead of the signals $X_i$, $Y_i$, $Z_i$, $\overline{X}_i$, $\overline{Y}_i$, $\overline{Z}_i$.

FIG. 5 is an example of the parity check circuit in FIG. 4, and is different from the circuit of FIG. 2*b* only in that a tied OR circuit 55 is employed instead of the OR circuit 29. Outputs from AND circuits 51 to 54 to which signals $(S_i, C_i, \alpha_i)$, $(S_i, \overline{C}_i, \overline{\alpha}_i)$, $(\overline{S}_i, C_i, \overline{\alpha}_i)$, $(\overline{S}_i, \overline{C}_i, \alpha_i)$ are supplied are formed through the tied OR circuit 55 into the parity check signal $CK_i$ of the *i*-th order.

Figures 6, 7:
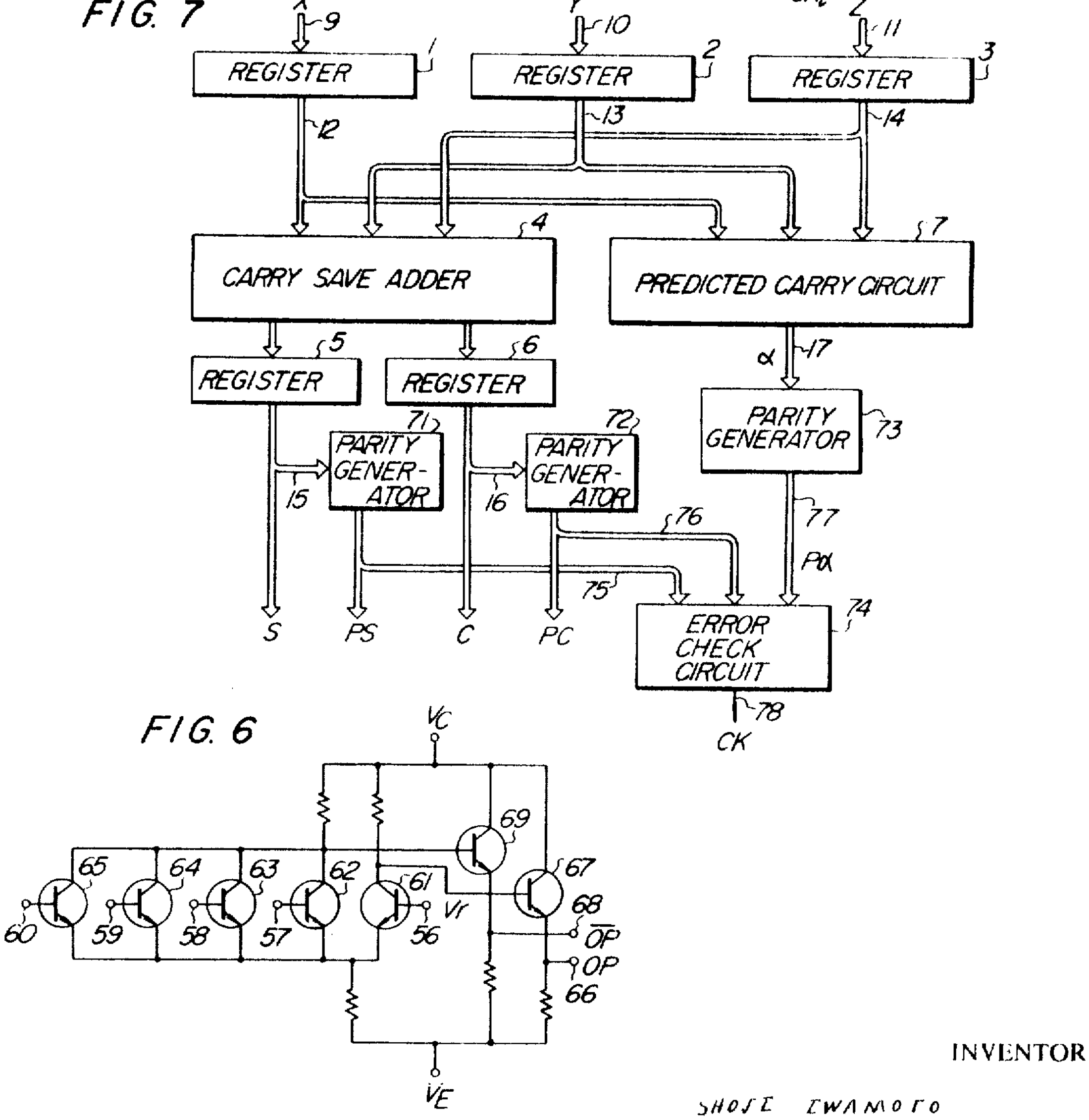
FIG. 6 is a circuit diagram of a logical circuit employed in the invention.
FIG. 7 is a block diagram of another embodiment of the invention.

The tied OR circuit can be used when a CML circuit (current mode logic), for example, as shown in FIG. 6 are employed as the AND circuits 51 to 54, at which time the OR logic thereof can be taken only by connecting the output lines of the AND circuits 51 to 54. By utilizing the tied OR, the number of logical circuits necessary for error check can be reduced.

As is evident also from Table I and II, there are two cases of even and odd for the parity check effected by the arrangement of FIG. 4 by the way of formation of the predicted carry signal $\alpha$. Therefore, also the check circuit 45 is different depending on which of the circuits of FIGS. 3*a* and 3*b* is employed as the predicted carry circuit 7.

When the circuit of FIG. 3*a* is employed as the predicted carry circuit 7, the parity is odd. In this case, by employing, for example, AND circuits as the check circuit 45, the logic $CK=CK_0\cdot CK_1\cdot CK_2\cdot\ldots\ldots\ldots CK_{n11}$ of the output signals $CK_0$, $CK_1$, ..., $CK_{n11}$ from the parity check circuits 41 to 44 is taken. If *CK* is "0," it is determined that an error has occurred.

On the other hand, when the circuit of FIG. 3*b* is employed as the predicted carry circuit 7, the parity is even. In this case, OR circuits, for example, is employed for the check circuit 45 to take the logic $CK=CK_0+CK_1+CK_2+\ldots+CK_{n11}$. If *CK* is "1," it is determined that an error has occurred.

In the CML circuit of FIG. 6, a plurality of transistors 62 to 65 having their emitters connected in common and their collectors also in common and a transistor 61 are connected in common at their emitters to constitute a current switching circuit, and their collector output signals are amplified by emitter follower circuits comprising transistors 67 and 69, respectively.

If at least one of input signals applied to input terminals 57 to 60 is at a higher level than a reference voltage $V_r$ applied to a terminal 56, a current flows through the transistor to which the higher level input signal is applied. Consequently, the collector potential of the transistor lowers, and an output signal at an output terminal 68 is at a lower level. Or the other hand, since a current does not flow through the transistor 61, the collector potential thereof rises, and hence an output signal that appears at an output terminal 66 through the transistor 67 is at a higher level.

In contrast, if all of the input signals applied to the input terminals 57 to 60 are lower than the reference voltage $V_r$, the current flows through the transistor 61, and hence a higher level output signal appears at the output terminal 68 and a lower level output signal appears at the output terminal 66.

Thus, with a positive logic in which a higher level is taken as "1," the circuit of FIG. 6 becomes an OR·NOR circuit, whereas with a negative logic in which a lower level is taken as "1," the circuit of FIG. 6 becomes an AND·NAND circuit. Consequently, by proper use of the positive or negative logic, both an AND circuit and an OR circuit can be constituted by the CML circuit of FIG. 6.

Since both an output signal OP and an inverted signal $\overline{OP}$ can be obtained from a CML circuit, the OR circuit 33 and inverter circuit 34 in FIG. 3*a* or the AND circuit 37 and inverter circuit 38 in FIG. 3*b* can be substituted by the CML circuit of FIG. 6 to eliminate the inverter circuit 34 or 38.

The reason why the aforementioned tied OR logic can be employed is that since the emitter follower circuits are provided at the output stage of the circuit of FIG. 6, the emitter follower logic can be formed only by connecting output terminals of a plurality of CML circuits.

FIG. 7 is another embodiment of the invention and is different from the embodiment of FIG. 1 in that parity generators 71, 72 and 73 are provided between the error check circuit 74 and the registers 5 and 6 and predicted carry circuit 7, respectively.

With the speedup of the operation of information processing apparatus such as an electronic computers or the like, occurrence of errors at the time of signal transmission in processing apparatuses has become a problem. Therefore, signals are usually transmitted accompanied by parity at each appropriate number of bits in electronic computers.

In such computers, parity generators shown at 71 and 72 in FIG. 7 are provided downstream of the carry save adder 4, and the sum signal *S* and the carry signal *C* are transmitted together with a parity signal PS of the sum and a parity signal PC of the carry generated at each appropriate numbers of bits of the sum signal *S* and the carry signal *C*.

Although the parity signals PS and PC may be attached at any number of bits, in many cases they are attached approximately at the rate of one bit per eight bits. It is assumed for the sake of simplicity of explanation and is not a limitation that the number of bits of the carry save adder 4 is 64, and one parity bit is provided at each eight bits.

The $j$-th signals $PS_j$ and $PC_j$ ($j=0, 1, 2, ...., 7$) of the parity signals PS and PC are expressed by the following equations, respectively, $$PS_j=S_{8j} \oplus S_{8j+1} \oplus S_{8j+2} \oplus .....\oplus S_{8j+7} \qquad (6)$$

$$PC_j=C_{8j} \oplus C_{8j+1} \oplus C_{8j+2} \oplus .....\oplus C_{8j+7} \qquad (7)$$

If a parity generator 73 similar to the parity generators 71 and 72 is provided on the output side of the predicted carry circuit 7, and if a one bit parity signal $P\alpha_j$ is generated at each eight bits of the predicted carry $\alpha(\alpha_0, \alpha_1, \alpha_2, ..., \alpha_{63})$, the one bit of parity signal $P\alpha_j$ is represented as $$P\alpha_j=\alpha_{8j} \oplus \alpha_{8j+1} \oplus \alpha_{8j+2} \oplus \cdots \oplus \alpha_{8j+7} \qquad (8)$$

Figure 8:
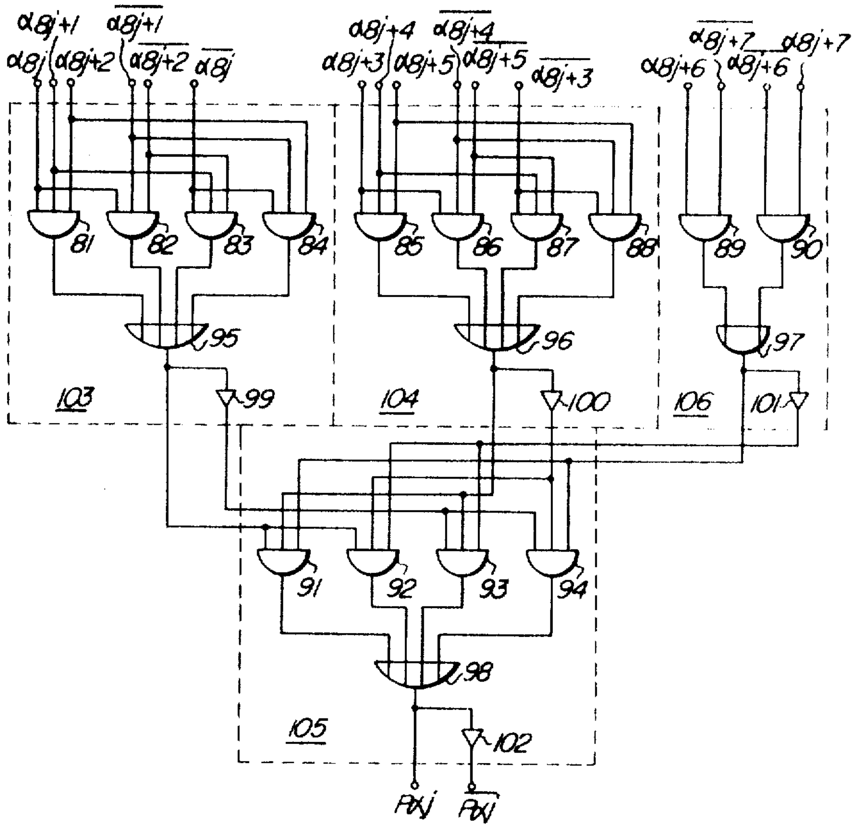
FIG. 8 is a circuit diagram of a part of the parity generator in the embodiment of FIG. 7.

FIG. 8 shows a circuit for generating the $j$-th parity bit $P\alpha_j$ of the parity generator 73. The parity generator 73 is constituted by eight circuits as shown in FIG. 8.

In FIG. 8, reference numerals 81 to 94 indicate AND gates, 95 to 98 indicate OR circuits, and 99 to 102 indicate inverter circuits. The inverter circuits 99 to 102 can be eliminated as stated before by employing CML circuits as shown in FIG. 6 as the OR circuits 95 to 98. Circuits 103, 104 and 105 correspond to parity check circuits of three bits, and the operations thereof are the same as those of the circuits of FIGS. 2b and 5. A circuit 106 is a parity check circuit of two bits.

In the circuit of FIG. 8, the parity of three bits is obtained by each of the parity check circuits 103 and 104, the parity of two bits is obtained by the parity check circuit 106. Output signals from the parity check circuits 103, 104 and 106 are supplied to the parity check circuit 105 to provide the parity signal $P\alpha_j$ represented by the logic of equation (8) and its inverted signal $\overline{P\alpha_j}$.

The parity signals $PS$, $PC$ and $P\alpha$ thus produced are supplied through signal lines 75, 76 and 77, respectively, to the error check circuit 74. The arrangement of the error check circuit 74 is almost similar to that of FIG. 4 except that input signals $(PS_0, PC_0, P\alpha_0)$, $(PS_1, PC_1, P\alpha_1)$, ....., $(PS_7, PC_7, P\alpha_7)$ are applied to the error check circuit 74 instead of the input signals $(S_0, C_0, \alpha_0)$, $(S_1, C_1, \alpha_1)$, ...., $(S_{n11}, C_{n11}, \alpha_{n11})$, and hence the number of parity check circuits is reduced.

An output signal $CK_j$ of the $i$-th parity check circuit of the error check circuit 74 is represented by $$CK_j=PS_j \oplus PC_j \oplus P\alpha_j \qquad (9)$$

By substituting Equations (6), (7) and (8) for $PS_j$, $PC_j$ and $P\alpha_j$ in equation (9) and rearranging, equation (9) is transformed into $$CK_j=(S_{8j} \oplus C_{8j} \oplus \alpha_{8j}) \oplus (S_{8j+1} \oplus C_{8j+1} \oplus \alpha_{8j+1}) \oplus \cdots$$
$$\cdots \oplus (S_{8j+7} \oplus C_{8j+7} \oplus \alpha_{8j+7}) \qquad (10)$$

Since $(S_i \oplus C_i \oplus \alpha_i)$ is always "1" or "0," i.e. constant as shown in Tables I and II, the right-hand member of equation (10) is constituted by the exclusive OR of eight "1" or "0." Therefore, $CK_j$ is always "0" irrespective of whether $(S_i \oplus C_i \oplus \alpha_i)$ is "1" or "0" because the number of "1" is even. Therefore, when an operation error occurs in the carry save adder and the bit of either of the sum $S$ and carry $C$ is erroneous, $CK_j=0$ is no longer held, at which time $CK=1$ results by operating $CK=CK_0+CK_1+... +CK_7$. Thus, the error can be detected.

Figure 9:
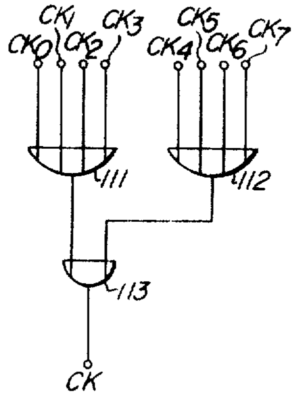
FIG. 9 is a circuit diagram of a part of the error check circuit in the embodiment of FIG. 7.

A circuit for obtaining $CK=CK_0+CK_1+...+CK_7$ corresponding to the check circuit 45 in FIG. 4 is shown in FIG. 9. Since FIG. 9 shows an example in which OR circuits of four inputs as shown in FIG. 6 are employed as OR circuits 111 and 112, the circuit of FIG. 9 is a two-stage logical circuit. The OR circuits 111 and 112 produce the logical sums of four input signals $(CK_0, CK_1, CK_2, CK_3)$ and $(CK_4, CK_5, CK_6, CK_7)$, respectively, and an OR circuit 113 produces the logical sum of output signals from the OR circuit 111 and 112 to provide the error check signal $CK$.

So far the parity generator 73 and error check circuit 74 in FIG. 7 have been described for the case where the carry save adder 4 consists of 64 bits and the parity of one bit is associated with each eight bits. However, a similar circuit construction can be employed also in case generally the parity of one bit is associated with each $m$ bits for an adder of $n$ bits, where $ml=n$. That is, in this case, a circuit for producing the $j$-th parity signal $P\alpha_j$ ($j=0, 1, 2, ..., l-1$) in the parity generator 73 is the circuit of FIG. 8 the input signals of which are replaced by $m$ input signals, and the error check circuit 74 includes $l$ parity check circuits as shown in FIG. 4 in which the input signals are replaced by $(PS_0, PC_0, P\alpha_0)$, $(PS_1, PC_1, P\alpha_1)$, ..., $(PS_{l11}, PC_{l11}, P\alpha_{l11})$. Here, the check circuit 45 in FIG. 4 is constituted, when $m$ is an even number, by OR circuits each forming the logical sum of $l$ input signals, and indicates the occurrence of error when the error check signal $CK$ is "1." When $m$ is odd, the check circuit 45 is constituted by AND circuits each forming the logical product of $l$ input signals or OR circuits each forming the logical sum of $l$ input signals depending on whether the principle of Table I is employed or the principle of Table II is employed as has been described with reference to the error check circuit 8 in FIG. 1.

Figure 10:
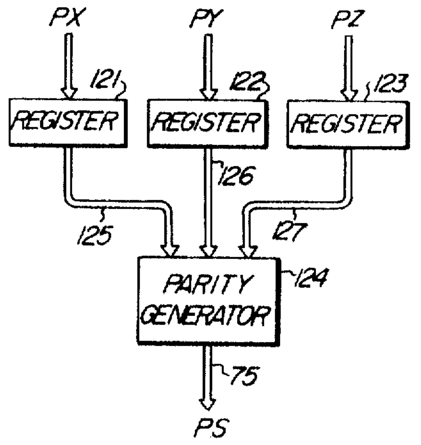
FIG. 10 is a block diagram of a part of a further embodiment of the invention.

FIG. 10 is the construction of a part of a further embodiment of the invention. FIG. 10 shows another example of the parity generator 71 in FIG. 7.

It is well known from the fact that the logic of the sum of the carry save adder is represented by equation (1), that the parity is conserved between an augend and addend and the sum thereof. Conversely, therefore, the parity $PS$ of the sum $S$ can be produced from the parities PX and PY of the augend $X$ and $Y$ and the parity PZ of the addend $Z$.

Registers 121, 122 and 123 in FIG. 10 are usually constructed integrally with the registers 1, 2 and 3 in FIG. 7, and set the parities PX, PY and PZ, respectively, therein. A parity generator 124 is supplied as its input signals with the parity signals PX, PY and PZ from the registers 121, 122 and 123 through signal lines 125, 126 and 127, respectively, to generate the parity signal PS of the sum S.

Since the $j$-th bit $PS_j$ of the parity signal PS is expressed by $$PS_j=PX_j \oplus PY_j \oplus PZ_j \qquad (11)$$

the parity generator 124 can be constituted by a plurality of circuits as shown in FIG. 2b to which the signals $PX_j$, $PY_j$, $PZ_j$, $\overline{PX_j}$, $\overline{PY_j}$ and $\overline{PZ_j}$ are applied as their input signals instead of the signals $X_i$, $Y_i$, $Z_i$, $\overline{X_i}$, $\overline{Y_i}$ and $\overline{Z_i}$.

In the embodiment of FIG. 10, however, since the operation error of the sum circuit cannot be detected, the error of the sum circuit should be detected by other methods.

As has been described, errors of the carry save adder at each bit can be detected in the embodiment of FIG. 1, while in the embodiment of FIG. 7, errors can be detected when an odd number of errors occur at each eight bits with which the parity of the carry save adder is associated.

When operation error of the carry save adder of 64 bits is detected by providing two sets of carry save adder and detecting the deviation from coincidence of the operations of the carry save adders, 874 CML circuits of FIG. 6 are necessary for the error detection, whereas in the embodiment of FIG. 1, the number of the CML circuits necessary for the error detection is 469, and in the embodiment of FIG. 7, the number of the CML circuits necessary for the error detection is only 371. Therefore, according to this invention, the cost of the error detection is very much reduced.

I claim:

1. An adder system including error-detecting circuitry comprising a carry save adder, the operation error of which is to be detected, means for generating a predicted carry signal for conserving the parity of sum and carry signals from input signals of said carry save adder representing an augend and addend, and means for detecting said operation error by checking the parity of signals representing sum and carry as a result of the operation of said carry save adder and said predicted carry signal.

2. An adder system according to claim 1, wherein said predicted carry signal generating means comprises a predicted carry circuit for generating such a predicted carry signal as making the parity of said predicted carry signal, said sum signal, and said carry signal constant.

3. An adder system according to claim 2, wherein said predicted carry circuit comprises a plurality of unit predicted carry circuits each provided correspondingly to each order of said carry save adder for generating a predicted carry signal for the corresponding order when two signals representing an augend of the corresponding order and a signal representing an addend of the corresponding order are not coincident.

4. An adder system according to claim 2, wherein said predicted carry circuit comprises a plurality of unit predicted carry circuits each provided correspondingly to each order of said carry save adder for generating a predicted carry signal for the corresponding order when two signals representing an augend of the corresponding order and a signal representing an addend of the corresponding order are coincident with each other.

5. An adder system according to claim 1, wherein said detecting means comprises a plurality of parity check circuit for checking the parity of said sum signal and carry signal for each bit generated by said carry save adder and said predicted carry signal for each bit generated by said signal-generating means, and a check circuit for generating an error check signal when at least one of said parity check circuits generates a signal indicating that the last-mentioned parity is not a predetermined one.

6. An adder system according to claim 3, wherein said check circuit comprises AND circuits for forming the logical product of output signals from said parity check circuits, and said signal generating means comprises a plurality of unit predicted carry circuits each provided correspondingly to each order of said carry save adder for generating a predicted carry signal for the corresponding order when two signals representing an augend of the corresponding order and a signal representing an addend of the corresponding order are coincident with each other.

7. An adder system according to claim 3, wherein said check circuit comprises OR circuits for forming the logical sum of output signals from said parity check circuits, and said signal-generating means comprises a plurality of unit predicted carry circuits each provided correspondingly to each order of said carry save adder for generating a predicted carry signal for the corresponding order when two signals representing an augend of the corresponding order and a signal representing an addend of the corresponding order are not coincident.

8. An adder system including error-detecting circuitry comprising a carry save adder, the operation error of which is to be detected, means for generating a predicted carry signal for conserving the parity of carry and sum signals from input signals of said carry save adder representing an augend and addend, parity generating means for generating parity bit signals at each appropriate number of bits of a sum signal and carry signal produced by said carry save adder and of said predicted carry signal, respectively, and means for detecting said operation error by checking the parity of said parity bit signals produced by said parity-generating means.

9. An adder system according to claim 8, wherein said predicted carry signal generating means comprises a predicted carry circuit for generating such a predicted carry signal as making the parity of said predicted carry signal, said sum signal, and said carry signal constant.

10. An adder system according to claim 9, wherein said predicted carry circuit comprises a plurality of unit predicted carry circuits each provided correspondingly to each order of said carry save adder for generating a predicted carry signal for the corresponding order when two signals representing an augend of the corresponding order and a signal representing an addend of the corresponding order are not coincident.

11. An adder system according to claim 9, wherein said predicted carry circuit comprises a plurality of unit predicted carry circuits each provided correspondingly to each order of said carry save adder for generating a predicted carry signal for the corresponding order when two signals representing an augend of the corresponding order and a signal representing an addend of the corresponding order are coincident with each other.

12. An adder system according to claim 8, wherein said parity-generating means comprises three parity generators provided correspondingly to said sum signal, carry signal and predicted carry signal for generating said parity bit signals by checking the parity at each appropriate number of bits of these signals.

13. An adder system according to claim 10, wherein said detecting means comprises at least one parity check circuit for checking the parity of corresponding bits of said parity bit signals generated by said three parity generators, and a check circuit for generating an error check signal when a signal generated by said parity check circuit is not of a predetermined parity.

14. An adder system according to claim 10, wherein said parity generator corresponding to said sum signal comprises parity check circuits for generating the parity of corresponding bits of parity signals being transmitted accompanying said augend and addend.